United States Patent
Pham et al.

(10) Patent No.: US 6,732,017 B2
(45) Date of Patent: May 4, 2004

(54) SYSTEM AND METHOD FOR POINT OF USE DELIVERY, CONTROL AND MIXING CHEMICAL AND SLURRY FOR CMP/ CLEANING SYSTEM

(75) Inventors: Xuyen Pham, Fremont, CA (US); Tuan Nguyen, San Jose, CA (US); Vien Quach, San Jose, CA (US); Ren Zhou, Fremont, CA (US)

(73) Assignee: Lam Research Corp., Fremont, CA (US)

( * ) Notice: Subject to any disclaimer, the term of this patent is extended or adjusted under 35 U.S.C. 154(b) by 79 days.

(21) Appl. No.: 10/077,831

(22) Filed: Feb. 15, 2002

(65) Prior Publication Data

US 2003/0158630 A1 Aug. 21, 2003

(51) Int. Cl.[7] .............................................. G05B 21/00
(52) U.S. Cl. ......................... 700/265; 700/266; 700/285
(58) Field of Search .................... 700/90, 91, 265–267, 700/285, 282

(56) References Cited

U.S. PATENT DOCUMENTS

| | | | |
|---|---|---|---|
| 4,642,766 A | * | 2/1987 | Funk et al. ..................... 705/7 |
| 4,850,703 A | * | 7/1989 | Hanaoka et al. ......... 366/160.1 |
| 4,976,546 A | * | 12/1990 | Beattie ..................... 366/162.3 |
| 5,240,324 A | * | 8/1993 | Phillips et al. .............. 366/132 |
| 5,642,756 A | | 7/1997 | Lawrence et al. |
| 5,803,599 A | | 9/1998 | Ferri, Jr. et al. |
| 6,056,431 A | * | 5/2000 | Owen et al. ................. 366/144 |
| 6,113,695 A | | 9/2000 | Fujimoto |
| 6,183,352 B1 | | 2/2001 | Kurisawa |
| 6,496,781 B1 | * | 12/2002 | Chen et al. .................... 702/25 |
| 2001/0037821 A1 | | 11/2001 | Staley et al. |

OTHER PUBLICATIONS

Bio–Chem Valve Inc. brochure, dated Oct. 3, 2001, p. 1 of 1.

* cited by examiner

Primary Examiner—Jayprakash N. Gandhi
(74) Attorney, Agent, or Firm—Martine & Penilla, LLP

(57) ABSTRACT

A chemical mechanical planarization (CMP) system includes a point of use chemical mixing system. The point of use chemical mixing system includes a first and a second pump, a first and a second flow sensor, a mixer and a controller. The first pump has an input coupled to a first chemical supply and the first flow sensor coupled to the output of the first pump. The second pump has an input coupled to a second chemical supply and the second flow sensor coupled to the output of the second pump. The mixer has inputs coupled to the output of the first and second flow sensors. The controller is configured to receive signals from the first and second flow sensors and to produce control signals for the first and second pumps and the mixer. The controller is further configured to cause a mixture of the first and second chemicals upon a demand from the CMP process.

20 Claims, 11 Drawing Sheets

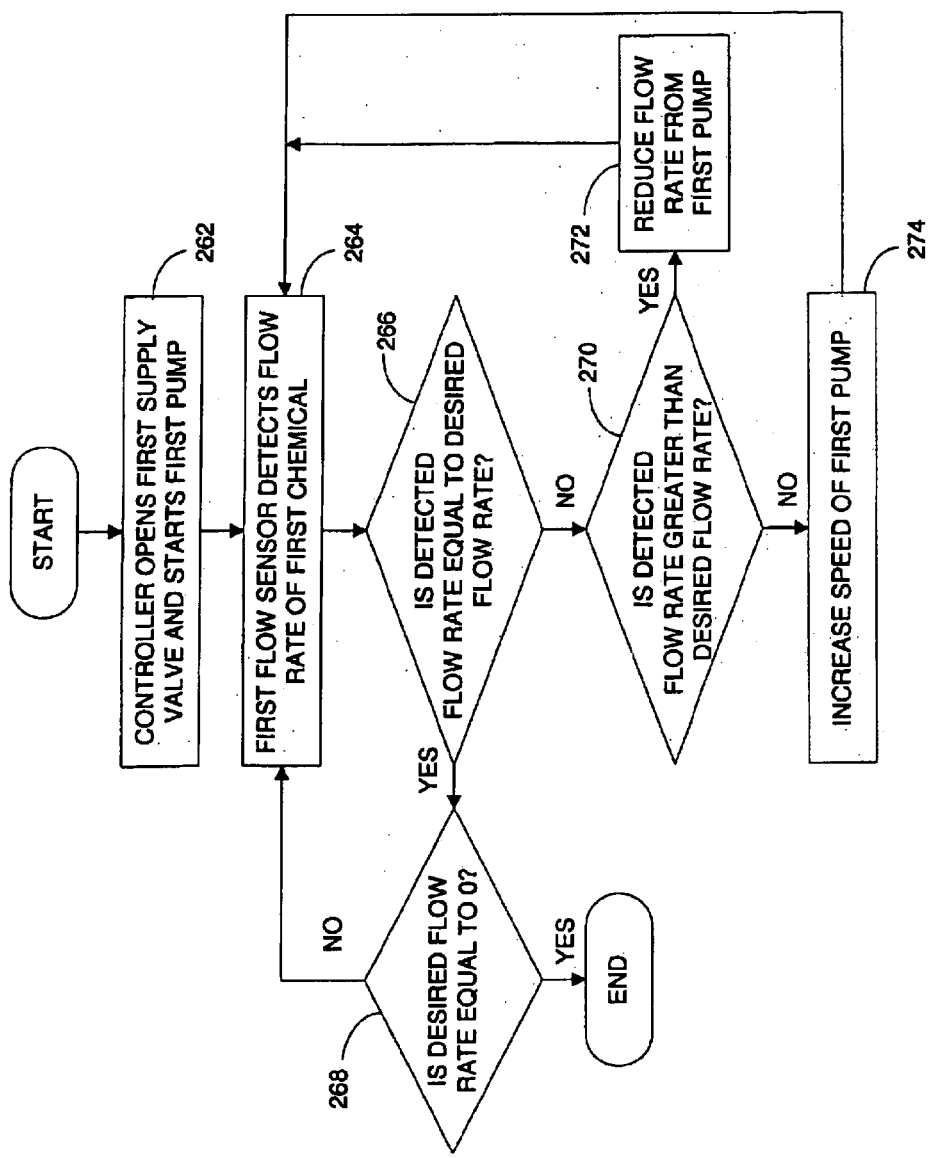

US 6,732,017 B2

SYSTEM AND METHOD FOR POINT OF USE DELIVERY, CONTROL AND MIXING CHEMICAL AND SLURRY FOR CMP/CLEANING SYSTEM

BACKGROUND OF THE INVENTION

1. Field of the Invention

The present invention relates generally to semiconductor wafer planarizing, and more particularly, to methods and systems for controlling and mixing chemicals for a chemical mechanical planarizing process.

2. Description of the Related Art

In the fabrication of semiconductor devices, there is a need to perform a variety of substrate preparation and fabrication operations including chemical mechanical planarization (CMP) operations, substrate cleaning, substrate polishing and buffing, substrate rinsing and drying, and other similar operations. Planarization, polishing, and cleaning operations are routinely performed on semiconductor wafers at various stages in the fabrication process. Typically, such operations are efficiently combined within process systems that are configured, for example, to receive batches of wafers at a time to be processed through CMP, polishing, buffing, cleaning, rinsing, and/or drying, followed by wafer processing through subsequent wafer fabrication operations.

Typically the chemicals required for such a CMP processes are prepared in a batch process system 100 such as shown in FIG. 1. FIG. 1 is a schematic diagram of a prior art system for mixing chemicals for a CMP process. A first chemical 101 is stored in a first supply tank 102 and a second chemical 103 is stored in a second supply tank 104. When a batch of the first and second chemicals 101, 103, is mixed, the respective supply valves 106, 108 are opened and a selected amount of the first and second chemicals 101, 103 are transferred to the batch mixing tank 110. The first and second chemicals 101, 103 are then mixed in the batch-mixing tank 110. Typically the mixed batch is tested through manual processes such as weighing the respective quantities of the first and second chemicals 101, 103 that are added to the batch mixing tank 110. Once the mixed batch of the chemicals is fully prepared and ready to be used, the batch supply valve 120 is opened and the batch-mixing tank 110 is pressurized to cause the mixture 123 to flow to a delivery tank 122. The delivery tank 122 can then be pressurized to deliver the mixture 123 to a mixture distribution manifold 124. The manifold 124 distributes the mixture to multiple points of use 130, 132, 134, through point of use supply valves 136, 138, 140 respectively. Each of the points of use 130, 132, 134 can represent a different CMP process tool or different locations within a single CMP process tool.

One of the problems with the batch process system 100 described above is that often the mixture 123 can only be used for a limited time period. For example, often, optimum CMP results require the mixture be used within the first sixty minutes after the mixture 123 is formed in the batch-mixing tank 110. The time limits may be due to reactivity of the mixture 123 or due to coagulation effects common to the slurry-type chemical used in the CMP process.

Another problem with the batch process system 100 is that the mixture 123 must be transferred to each point of use 130, 132, 134 via a distribution system (e.g., the manifold 124, the respective point of use supply valves 136, 138, 140 and interconnecting piping). When each batch of the mixture 123 expires or is no longer needed, the entire distribution system must be fully flushed and cleaned so that impurities of the previously expired batch do not contaminate successive batch mixtures. Further, the remaining mixture 123 contained in the distribution system becomes a waste product that must be disposed of which is both inefficient and typically expensive.

Yet another problem with the batch process system 100 is that often the mixture 123 is hazardous (e.g., caustic, acidic, flammable, poisonous, etc.). Because the mixture 123 is hazardous, the pressurized batch mixing tank 100 and delivery tank 122 must be very closely monitored and controlled. Further the batch-mixing tank 100 and delivery tank 122 are typically double walled to provide added safety containment of the hazardous mixture 123. The safety requirements of storing and pressurizing quantities of the hazardous mixture 123 increase the complexities of the batch process system 100 and the cost. Therefore the batch process system 100 is more expensive and less reliable than required.

Typically the batch process system 100 yields inconsistent batches because one batch is not exactly the same as another batch. Inconsistent batches often cause inconsistent CMP process results. The batches may be inconsistent because the measurements, such as the respective amounts of the first and second chemicals 101, 103, are different from one batch to another or because one batch has aged longer before use than another batch.

Similarly, the batch process system 100 does not produce a continuous and consistent mixture. This is because typical mixture control is in the batch mixing process in the batch-mixing tank 110. Once the mixture 123 is combined in the batch mixing tank 100 there typically is no further monitoring or testing to determine if the mixture is correct or becomes too aged or contaminated. As a result, if the mixture 123 becomes incorrect, then the CMP results could also become incorrect.

Another problem with most batch-type mixing systems is that a quantity of the mixture 123 is prepared in advance of the actual need of the mixture 123. If for any reason the mixture 123 is not needed (e.g., the CMP process is delayed until after the mixture 123 is too aged), then the entire mixture 123 must be discarded as a waste product. This results in excessive waste, which is both inefficient and typically expensive.

In view of the foregoing, there is a need for a more efficient, accurate delivery system of the CMP chemicals.

SUMMARY OF THE INVENTION

Broadly speaking, the present invention fills these needs by providing a point of use chemical mixing system in a chemical mechanical planarization system. It should be appreciated that the present invention can be implemented in numerous ways, including as a process, an apparatus, a system, computer readable media, or a device. Several inventive embodiments of the present invention are described below.

A chemical mechanical planarization system includes a point of use chemical mixing system. The point of use chemical mixing system includes a first and a second pump, a first and a second flow sensor, a mixer and a controller. The first pump has an input coupled to a first chemical supply and the first flow sensor coupled to the output of the first pump. The second pump has an input coupled to a second chemical supply and the second flow sensor coupled to the output of the second pump. The mixer has inputs coupled to the output of the first and second flow sensors. The controller is configured to receive signals from the first and second flow sensors and to produce control signals for the first and second pumps and the mixer. The controller is further configured to cause a mixture of the first and second chemicals upon a demand from the CMP process.

A method of mixing two or more chemicals for a CMP system includes pumping a first and a second chemical to a point of use. Monitoring a flow rate of the first chemical from a first pump and monitoring a flow rate of the second chemical from a second pump. Controlling the flow of the first and second chemicals into a mixer upon demand for a mixture of the first and second chemicals. Outputting the mixture to the CMP process.

In one embodiment, the flow of the first and the second chemicals into the mixer is controlled according to an aspect of the mixture such as a pH level of the mixture or a density of the mixture.

In one embodiment, the first and second pumps include a tubephram-type pump.

Mixing the CMP chemicals, upon demand, at the point of use reduces waste and provides more accurate and consistent chemical mixtures. A point of use mixing system also allows constant feedback and control of the mixing process. Point of use mixing also reduces cost and complexity over prior-art batch mixing systems.

Point of use mixing also reduces waste by substantially eliminating mixtures produced before being required and by reducing the size of the distribution system for the mixtures.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIG. 2C is a flowchart diagram that illustrates the method operations performed in controlling the flow of the first chemical in a point of use mixing system in accordance with one embodiment of the present invention.

DETAILED DESCRIPTION OF THE EXEMPLARY EMBODIMENTS

Several exemplary embodiments for a chemical mechanical planarization system including a point of use chemical mixing system will now be described. It will be apparent to those skilled in the art that the present invention may be practiced without some or all of the specific details set forth herein.

Point of use mixing CMP chemicals can result in more efficient use of the chemicals and reduce the waste products such as excess mixture in a mixture distribution system or excess batch-prepared mixture. In addition a point-of use mixture system can provide a continuous flow of the mixture. If the mixture is also continuously monitored, a feedback control loop can also be established to maintain a more constant mixture.

Figure 1:
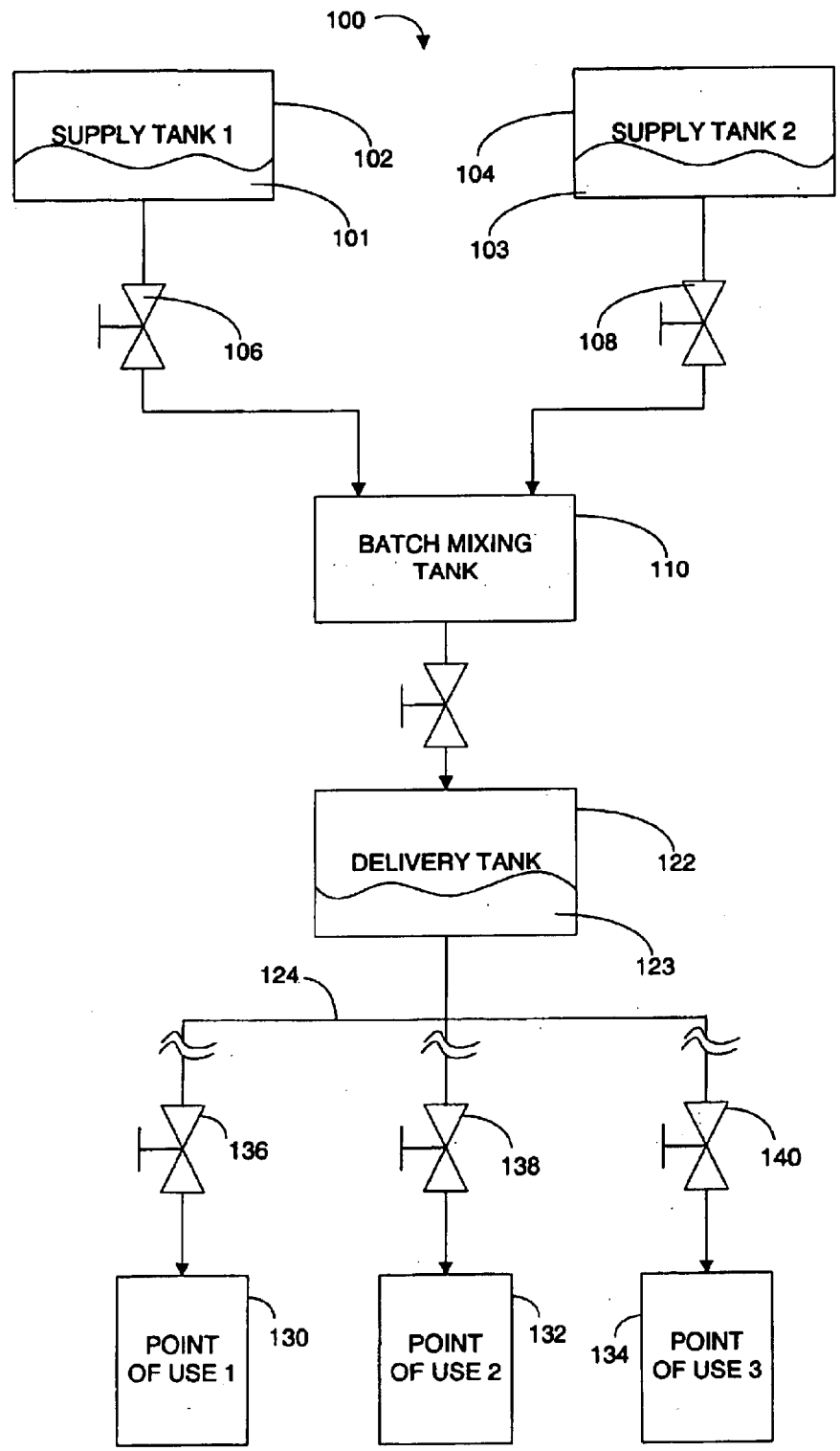
FIG. 1 is a schematic diagram of a prior art system for mixing chemicals for a CMP process.
Figure 2A:
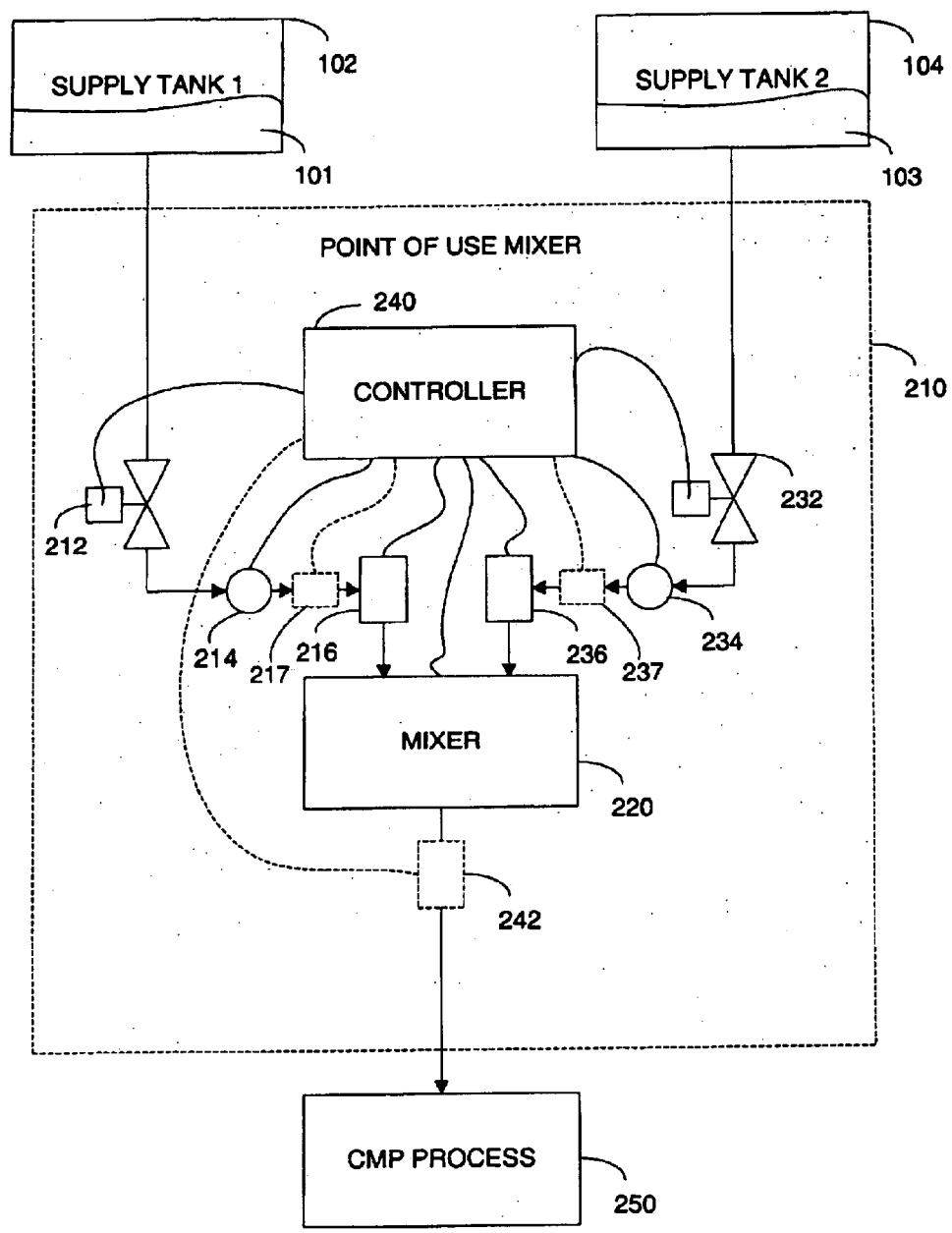
FIG. 2A is a piping and instrumentation diagram (P&ID) of a point of use mixing system using two chemicals in accordance with one embodiment of the present invention.

FIG. 2A is a piping and instrumentation diagram (P&ID) of a point of use mixing system 200 using two chemicals in accordance with one embodiment of the present invention. Although FIG. 2A illustrates a two chemical point of use system, the system and processes described below can also be extended to three or more chemicals. A first chemical 101 such as a first slurry (e.g., Hitachi slurry PN HFA005 or other suitable slurry) is stored in a first supply tank 102. A second chemical 103 such as deionized water (DI water) or a second slurry or other chemical to be mixed with the first chemical, is stored in a second supply tank 104. A point of use mixer 210 includes a several components that mix the first and second chemicals 101, 103. Specifically, the point of use mixer includes a first supply valve 212 is disposed between the first supply tank 102 and an input of a first pump 214. An output of the first pump 214 is coupled to an input of a first flow sensor 216. An output of the first flow sensor 216 is coupled to a first input to a mixer 220. A second supply valve 232 is disposed between the second supply tank 104 and an input of a second pump 234. An output of the second pump 234 is coupled to an input of a second flow sensor 236. An output of the second flow sensor 236 is coupled to a second input to the mixer 220. An output of the mixer 220 is coupled to the CMP process tool 250. A controller 240 is electrically coupled to the first and second supply valves, 212, 232, the first and second pumps 214, 234, the first and second flow sensors 216, 236 and the mixer 220.

The first and second pumps 214, 234 can also include a first and second pressure regulators 217, 237, respectively. The pressure regulators 217, 237 reduce or dampen the normal pressure fluctuations caused by the first and second pumps 214, 234. The output of the mixer 220 can also include a monitor sensor that can be electrically coupled to the controller 240. The first and second supply valves 212, 232 can be normally closed valves so that without a control input the first and second supply valves 212, 232 are automatically closed. Normally closed valves increase the safety of the control of the first and second chemicals 101, 103, respectively.

In operation, the controller 240 opens the first supply valve 212 and activates the first pump 214 so that the first pump 214 can draw the first chemical toward the mixer 220. The first flow sensor 216 then detects the flow rate of the first chemical 101 toward the mixer 200 and outputs the detected flow rate to the controller 240. The controller then uses the detected flow rate obtained from first flow sensor 216 to adjust the flow rate of the first chemical to the desired flow rate.

Simultaneously with the first chemical 101 flowing into the mixer 220, the second chemical 103 is also pumped into the mixer at a controlled, desired flow rate through the second supply valve 232, the second pump 234 and the second flow sensor 236, respectively. The desired flow rate of the first chemical 101 and the desired flow rate of the second chemical 103 are combined in the mixer 220 to produce a desired mixture in the mixer 220.

The controller 240 forms a closed loop control system of the flow rate of the first chemical 101 by measuring the flow rate through the first flow sensor 216 and adjusting the pumping speed of the pump 214 to maintain the desired flow rate of the first chemical 101. Similarly, the controller 240 forms a closed loop control system of the flow rate of the second chemical 103 by measuring the flow rate through the second flow sensor 236. The controller 240 then adjusts the pumping speed of the second pump 234 to maintain the desired flow rate of the second chemical 103. By maintaining a known flow rate of the first and second chemicals 101, 103 into the mixer 220, the mixture of the desired proportions of the first and second chemicals 101, 103 can be continuously maintained.

Figure 2B:
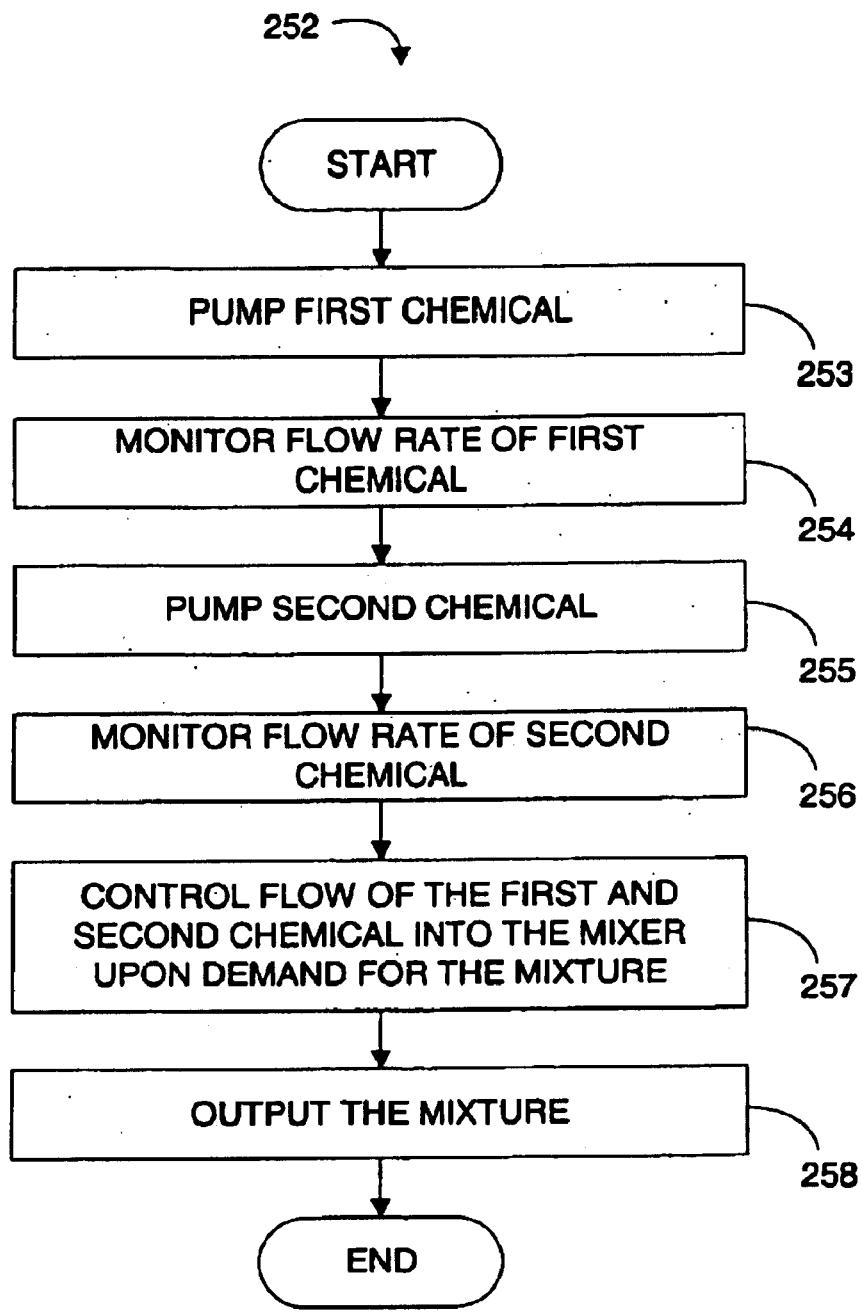
FIG. 2B is a flowchart diagram that illustrates the method operations performed in controlling the flow of the first chemical in a point of use mixing system 200 in accordance with one embodiment of the present invention.

FIG. 2B is a flowchart diagram that illustrates the method operations 252 performed in controlling the flow of the first chemical in a point of use mixing system 200 in accordance with one embodiment of the present invention. In operation 253, the first chemical 101 is pumped to the point of use mixing system. The flow rate of the first chemical 101 is monitored in operation 254. In operation 255, the second chemical 103 is pumped to the point of use mixing system. The flow rate of the second chemical 103 is monitored in operation 256. In operation 257 the flow of the first and second chemicals to the mixer are controlled according to demand for the mixture of the first and second chemicals 101, 103. In operation 258, the mixture is output to be used such as in a CMP process.

Figure 2D:
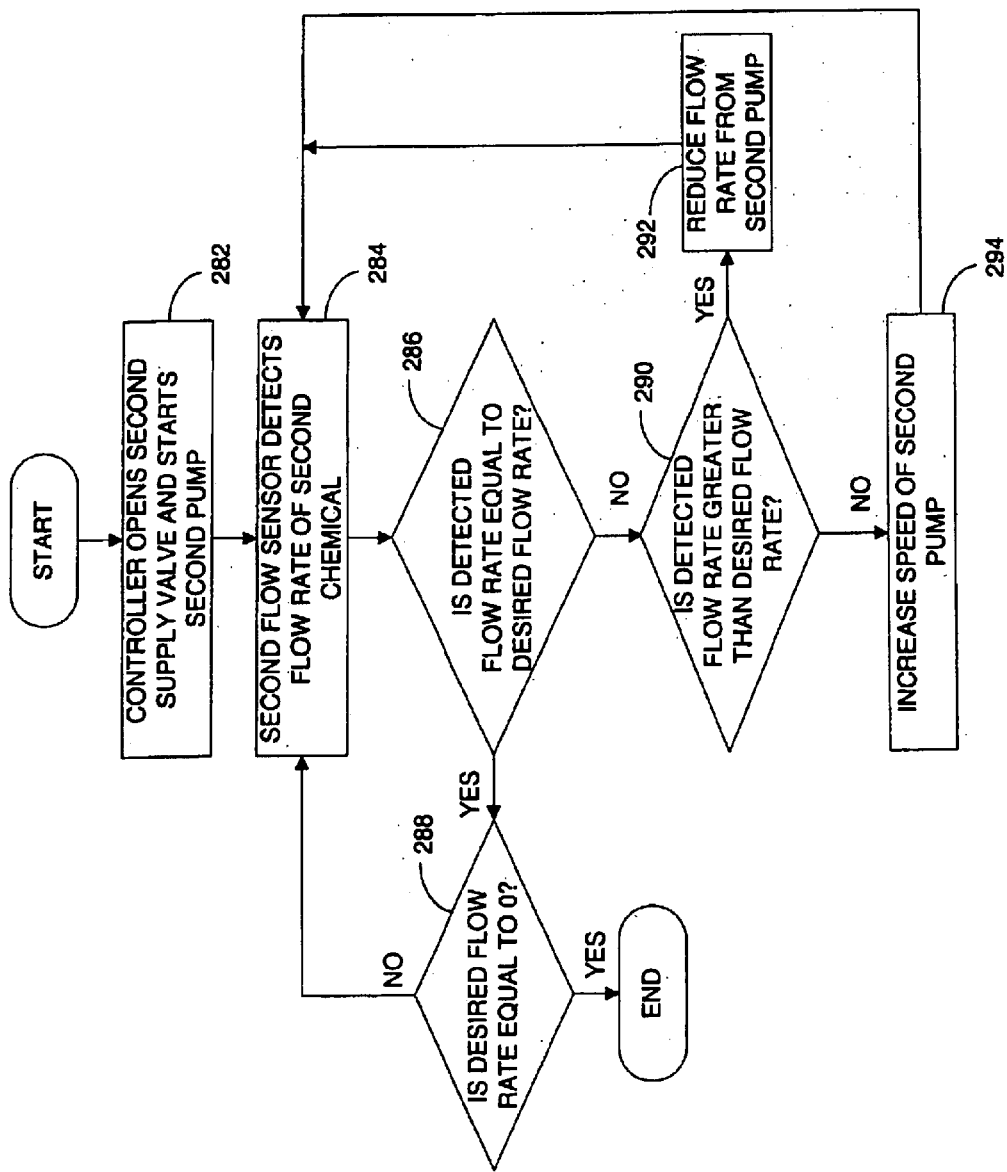
FIG. 2D is a flowchart diagram that illustrates the method operations performed in controlling the flow of the second chemical in a point of use mixing system in accordance with one embodiment of the present invention.

FIG. 2C is a flowchart diagram that illustrates the method operations performed in controlling the flow of the first chemical in a point of use mixing system 200 in accordance with one embodiment of the present invention. FIG. 2D is a flowchart diagram that illustrates the method operations performed in controlling the flow of the second chemical in a point of use mixing system 200 in accordance with one embodiment of the present invention. To simplify discussion, the control of the flow of the first and second chemicals 101, 103 will be described separately. However, in at least one embodiment, the controller 240 simultaneously controls the flow rates of the first and second chemicals 101, 103.

In FIG. 2C, in operation 262, the controller 240 causes the first supply valve 212 to open and the first pump 214 to draw the first chemical 101 into the mixer 220. In operation 264, the first flow sensor 216 detects the flow rate of the first chemical 101 output from the first pump 214. The flow sensor 216 communicates the detected flow rate to the controller 240. In operation 266, the detected flow rate of the first chemical 101 is compared to the desired flow rate of the first chemical 101. If, in operation 266, the detected flow rate of the first chemical 101 is equal to the desired flow rate of the first chemical, then, in operation 268 the desired flow rate is examined. If in operation 268, the desired flow rate is equal to zero "0" then the method operations end. If, in operation 268, the desired flow rate is not equal to zero "0" then the method operations continue in operation 264.

If, in operation 266, the detected flow rate of the first chemical 101 is not equal to the desired flow rate of the first chemical, then, in operation 270 the detected flow rate is examined to determine if the detected flow rate is greater than the desired flow rate. If, in operation 270, the detected flow rate is greater than the desired flow rate then in operation 272 the controller 240 reduces the flow rate from the first pump 214. The method operations then continue in operation 264 as described above. If in operation 270, the detected flow rate is not greater than the desired flow rate then in operation 274 the controller 240 increases the flow rate from the first pump 214. The method operations then continue in operation 264 as described above.

In FIG. 2D, in operation 282, the controller 240 causes the second supply valve 232 to open and the second pump 234 to draw the second chemical 103 into the mixer 220. In operation 284, the second flow sensor 236 detects the flow rate of the second chemical 103 output from the second pump 234. The flow sensor 236 communicates the detected flow rate to the controller 240. In operation 286, the detected flow rate of the second chemical 103 is compared to the desired flow rate of the second chemical 103. If, in operation 286, the detected flow rate of the second chemical 103 is equal to the desired flow rate of the second chemical, then, in operation 288 the desired flow rate is examined. If, in operation 288, the desired flow rate is equal to zero "0" then the method operations end. If, in operation 288, the desired flow rate is not equal to zero "0" then the method operations continue in operation 284.

If, in operation 286, the detected flow rate of the second chemical 103 is not equal to the desired flow rate of the second chemical, then, in operation 290 the detected flow rate is examined to determine if the detected flow rate is greater than the desired flow rate. If, in operation 290, the detected flow rate is greater than the desired flow rate then in operation 292 the controller 240 reduces the flow rate from the second pump 234. The method operations then continue in operation 284 as described above. If in operation 290, the detected flow rate is not greater than the desired flow rate then in operation 294 the controller 240 increases the flow rate from the second pump 234. The method operations then continue in operation 284 as described above.

Alternatively, the controller 240 can create a closed-loop feedback control by monitoring one or more aspects of the mixture output from the mixer 220. A mixture sensor 242 monitors the mixture. In one embodiment, the mixture sensor 242 includes a pH sensor. The pH sensor can continuously measure the pH level of the mixture. For example, in a point of use mixing system a pH level of 8.02 represents the pH level of the desired mixture. Further, the first chemical 101 has a higher pH level than the second chemical 103. If the controller detects a mixture pH level of 8.01, then the controller can automatically adjust the proportion of the first and second chemicals 101, 103 to increase the detected pH level to the desired 8.02 level.

Figure 2E:
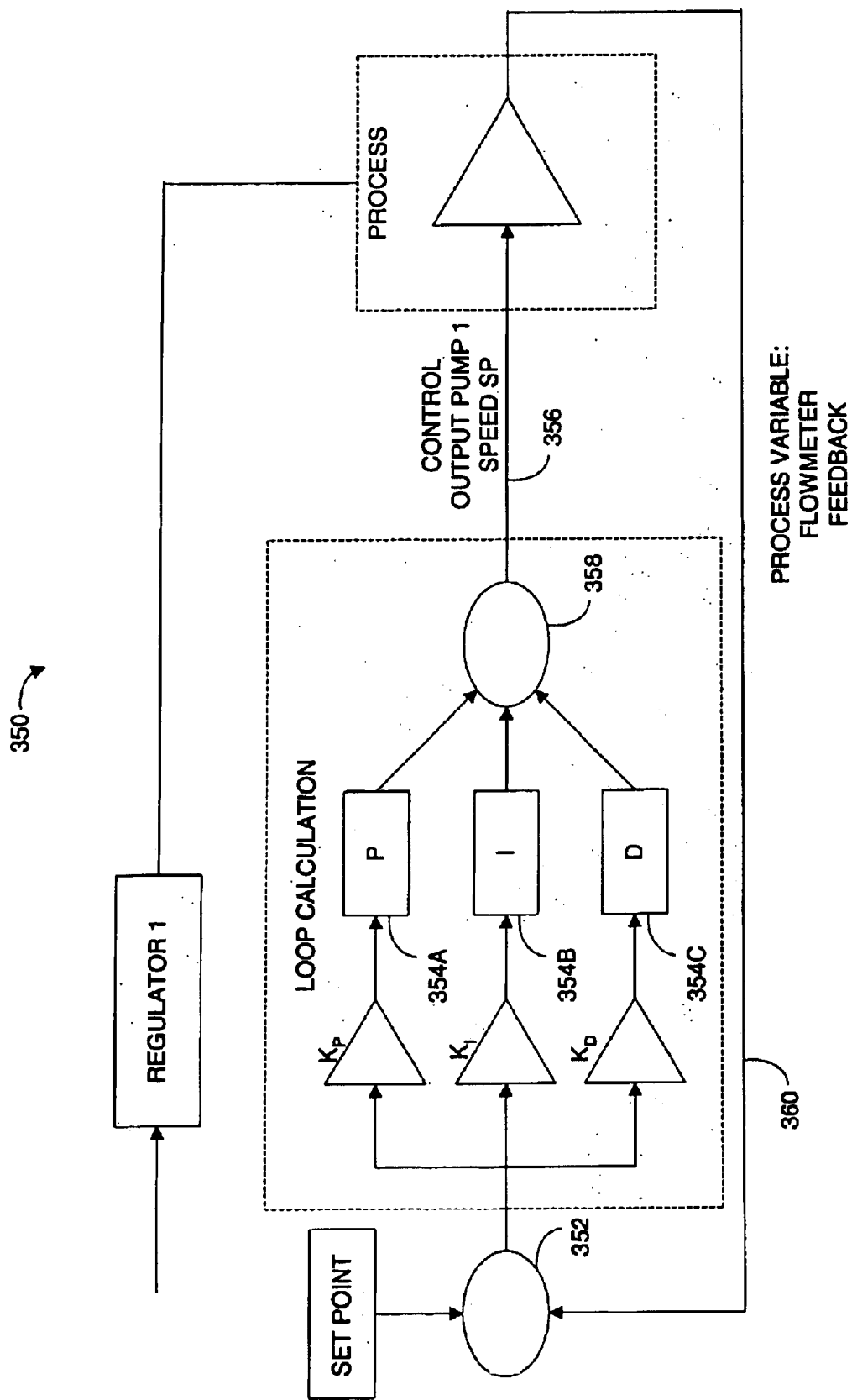
FIG. 2E is a block diagram of the proportional, integral, derivative (PID) controls in controlling the flow of the first chemical 101 in a point of use mixing system in accordance with one embodiment of the present invention.

FIG. 2E is a block diagram 350 of the proportional, integral, derivative (PID) controls in controlling the flow of the first chemical 101 in a point of use mixing system 200 in accordance with one embodiment of the present invention. Although the PID controls are described in relation to controlling the flow of only the first chemical 101 the same principles are applicable to controlling any other control variable such as controlling the flow of the second chemical 103 or controlling other aspects of the mixture 123. A desired setpoint, such as a desired flow rate of the first chemical 101, is applied to the input 352. The proportional, integral, derivative variables $K_p$, $K_i$, $K_d$ are extracted from the signal applied to the input 352. Each of the PID variables are applied to corresponding PID calculations 354A, 354B, 354C to produce a control signal 356 at the output 358. For example the control signal output may be a first pump 214 speed control signal. The control signal 356 is then applied to the process (e.g., first pump speed control signal applied to the control input of the first pump 214, etc.). A feedback signal 360 is fed back to the input 352 to provide an error control/feedback. If the setpoint applied to the input 352 is the desired flow rate of the first chemical 103, then the feedback signal 360 may be a detected flow rate of the first chemical 103 from the first pump 214 such as from the first flow sensor 216.

Figure 3:
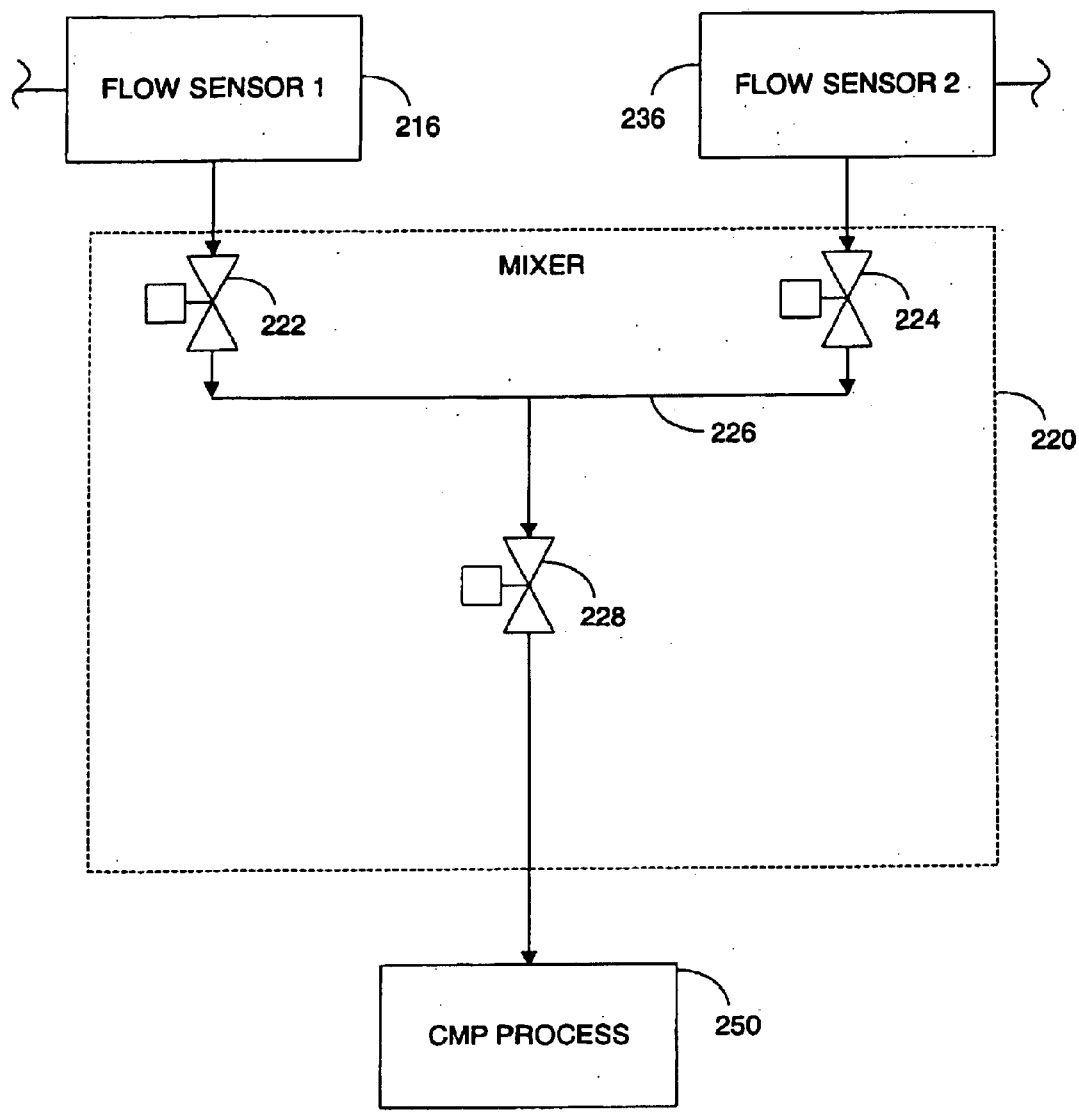
FIG. 3 is a piping and instrumentation diagram (P&ID) of a mixer using two chemicals in accordance with one embodiment of the present invention.

FIG. 3 is a piping and instrumentation diagram (P&ID) of a mixer 220 using two chemicals in accordance with one embodiment of the present invention. Although FIG. 3 illustrates a two chemical mixer, the system and processes described below can also be extended to three or more chemicals. A first mixer input valve 222 controls input of the first chemical 101 from the first flow sensor 216 to the mixer manifold 226. A second mixer input valve 224 controls input of the second chemical 103 from the second flow sensor 236 to the mixer manifold 226. The first and the second chemicals 101, 103 mix in the mixer manifold 226. A mixer output valve 228 controls the output from the mixer manifold 226 to the CMP process 250.

In one embodiment, the piping dimensions (e.g., lengths and diameters of the interconnecting piping) between each the input valves 222, 224 and the mixing manifold 226 are the same. In one embodiment the mixer 220 is a radial valve mixer such that each input valve 222, 224 are located on opposing sides and equidistant from a center mixing manifold. An example of a suitable radial valve miser is a series 089M & 079NC manifold assembly available from Bio-Chem Valve, Inc. of 85 Fulton Street, Boonton, N.J. Alternatively, the mixer 220 can be a linear configuration similar to the mixer 220 illustrated in FIG. 3.

Figure 4A:
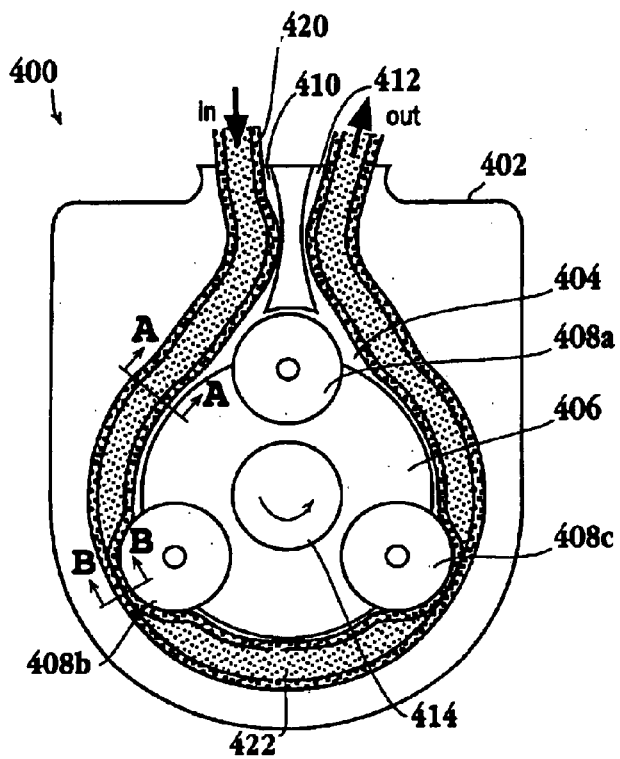
FIG. 4A illustrates a rotary pump 400 in accordance with one embodiment of the present invention.

FIG. 4A illustrates a rotary pump 400 in accordance with one embodiment of the present invention. The first and second pumps 214, 234 can be a rotary pump such as shown in FIG. 4A. A rotary pump 400 includes a housing forming an approximately round inner chamber 404. A rotor 406 is centered in the inner chamber 404. The rotor includes two or more (in this instance three) compressor wheels 408A, 408B, 408C. The housing 402 also includes an inlet 410 and an outlet 412 that are substantially tangential to the inner chamber 404. Compressible tubing 420 is routed through the inlet 410 around the inner circumference of the chamber 404 and out the outlet 412. The compressor wheels 408A, 408B, 408C compress the compressible tubing 420 against the inner circumference of the chamber 404. In operation, as the rotor 406 is rotated in a counter-clockwise direction about the center axis 414 a compressor wheel presses the compressible tubing 420 against the inner circumference of the chamber 404. A volume, such as the volume 422, is trapped between compressor wheels 408B, 408C. The volume 422 includes a fluid such as the first chemical 101. As the rotor 406 continues to rotate counter-clockwise, the volume 422 of the first chemical 101 is propelled toward and eventually out the outlet 412. A nearly continuous flow of the first chemical 101 can thereby be nearly continuous.

Figure 4B:
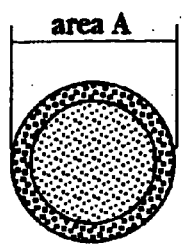
FIGS. 4B and 4C show cross-sections of the compressible tubing at the A section shown in FIG. 4A.
Figure 4C:
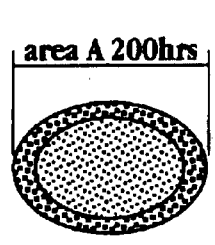

FIG. 4B shows a cross-section of the compressible tubing 420 at the A section as shown in FIG. 4A. Initially the cross-section of the compressible tubing 420 is substantially round. As the tubing is successively compressed over an extended time, the sidewalls of the compressible tubing 420 begin to deform and the cross-section begins to resemble an oval as shown in FIG. 4C. The area of the oval cross-section shown in FIG. 4C is substantially less than the area of the circular cross-section of FIG. 4B. When the tubing becomes deformed into an oval cross-section the volume (such as volume 422 above) between two compressor wheels is reduced and therefore the volume pumped per rotation is reduced.

Figure 4D:
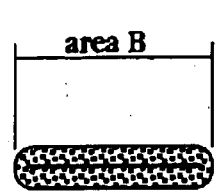
FIG. 4D shows a cross-section of the compressible tubing at the B section shown in FIG. 4A.

FIG. 4D shows a cross-section of the compressible tubing 420 at the B section shown in FIG. 4A. When the compressor wheel 408B compresses the tubing 420 against the inner wall of the chamber 404, the sidewalls of the tubing 420 are pressed together. As a result, particles can be dislodged from the walls of the tubing 420. The dislodged particles are then released into the chemical (e.g., the first chemical 101) being pumped.

Figure 4E:
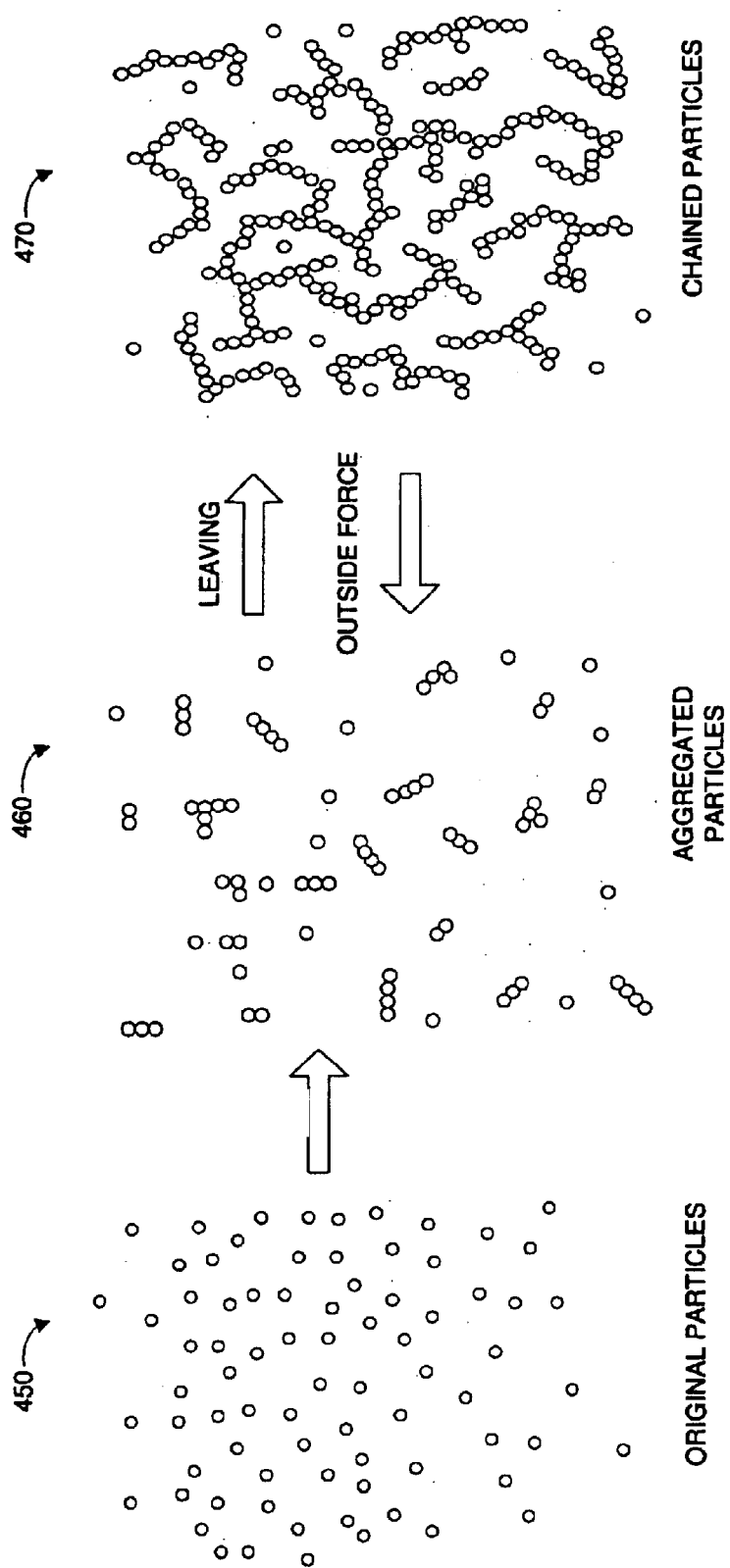
FIG. 4E shows particles that can be aggregated when the particles are compressed between the sidewalls of the tubing.

FIG. 4E shows particles that can be aggregated when the particles are compressed between the sidewalls of the tubing 420. Original particles 450 are typical particles such as abrasive particles that may be included in a CMP slurry that is being pumped. The original particles have a tendency to aggregate together to form aggregated particles 460. When aggregated particles 460 are compressed together, such as when the particles are compressed between the sidewalls of the tubing 420, the particles can be chained together to form even larger chained particles 470.

Figure 5:
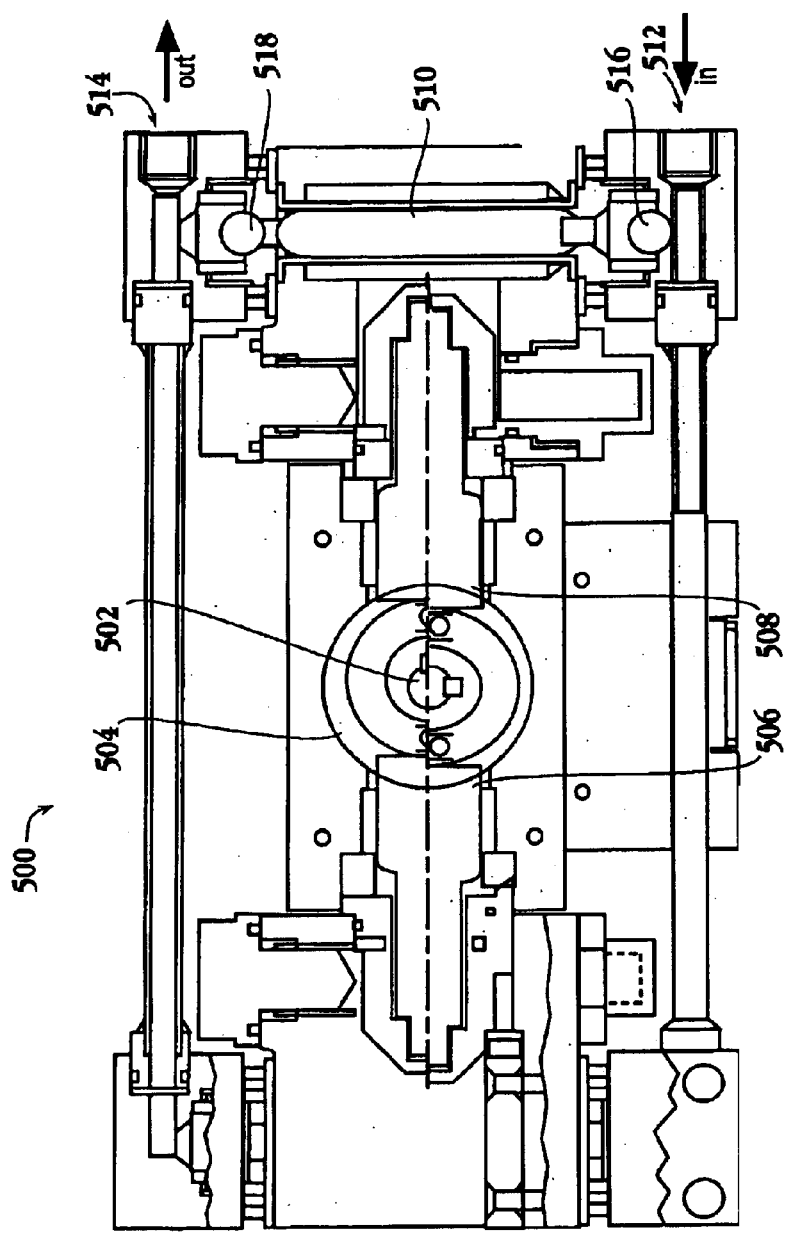
FIG. 5 illustrates a tubephram type pump in accordance with one embodiment of the present invention.

FIG. 5 illustrates a tubephram type pump 500 in accordance with one embodiment of the present invention. The tubephram type pump 500 includes a centrally located axis 502. A cam 504 rotates on the axis 502. A left slide shaft 506 and a right slide shaft 508 ride against the surface of the cam 504. As the cam rotates, the right and left side shafts 506, 508 slide right and left respectively to compress a right tubephram 510 and a left tubephram (not shown) respectively. The right tubephram 510 is coupled to the inlet 512 and the outlet 514. A right inlet check valve 516 allows fluid to flow from the inlet 512 into the right tubephram 510. When the right slide shaft 508 is pressed right to compress the right tubephram 510, the fluid pressure inside the right tubephram 510 increased. As the pressure inside the right tubephram 510 increases the right inlet check valve 516 closes and a right outlet check valve 518 opens and the pressurized fluid flows out the outlet 514. As the right slide shaft 508 slides left, the right tubephram 510 automatically re-forms into the shape before being compressed by the right slide shaft 508. As the right tubephram 510 re-forms, the pressure inside the right tubephram 510 decreases. When the pressure inside the right tubephram 510 decreases, the right outlet check valve 518 closes and the right inlet check valve 516 opens to draw fluid into the right tubephram 510. The left tubephram (not shown) operates similarly to the right tubephram 510.

A tubephram type pump is available from Iwaki Walchem of 5 Boynton Road Holliston, Mass. 01746, Part no. CSP-05ED-BP-S01 or similar tubephram-type pumps. A tubephram type pump is preferable over a rotary pump because the tubephram pump does not fully compress the sides of the tubephram 510 together. Because the sides of the tubephram 510 are not pressed together, the particles are not pressed into chained particles such as shown in FIG. 4E above. Also, because the sides of the tubephram 510 are not pressed together the sides of the tubephram 510 do not breakdown as quickly and thereby produce particles into the fluid passing through the tubephram 510. Also because the sides of the tubephram 510 are not pressed together, the sides of the tubephram 510 do not deform into an oval cross-section as rapidly as the compressible tubing 420 in the rotary pump 400 described above. Therefore, the efficiency of the tubephram type pump does not suffer as quickly as the rotary pump 400. In one embodiment the first and second pumps 214, 234 have a flow rate range of between 15 and 250 ml/minute.

The controller 240 of FIG. 2A is any suitable type of controller as are well known in the art. The controller 240 is configurable to receive the inputs described above, execute the PID control signals, and produce the outputs to control the various controllable devices (e.g., pumps 214, 234, valves 212, 232, etc.). In one embodiment, the controller 240 can be a programmable logic controller (PLC) such as is available from Siemens or any other supplier of suitable PLCs. Alternatively, the controller 240 can be any type of generic computing system such as a personal computer.

Figure 6:
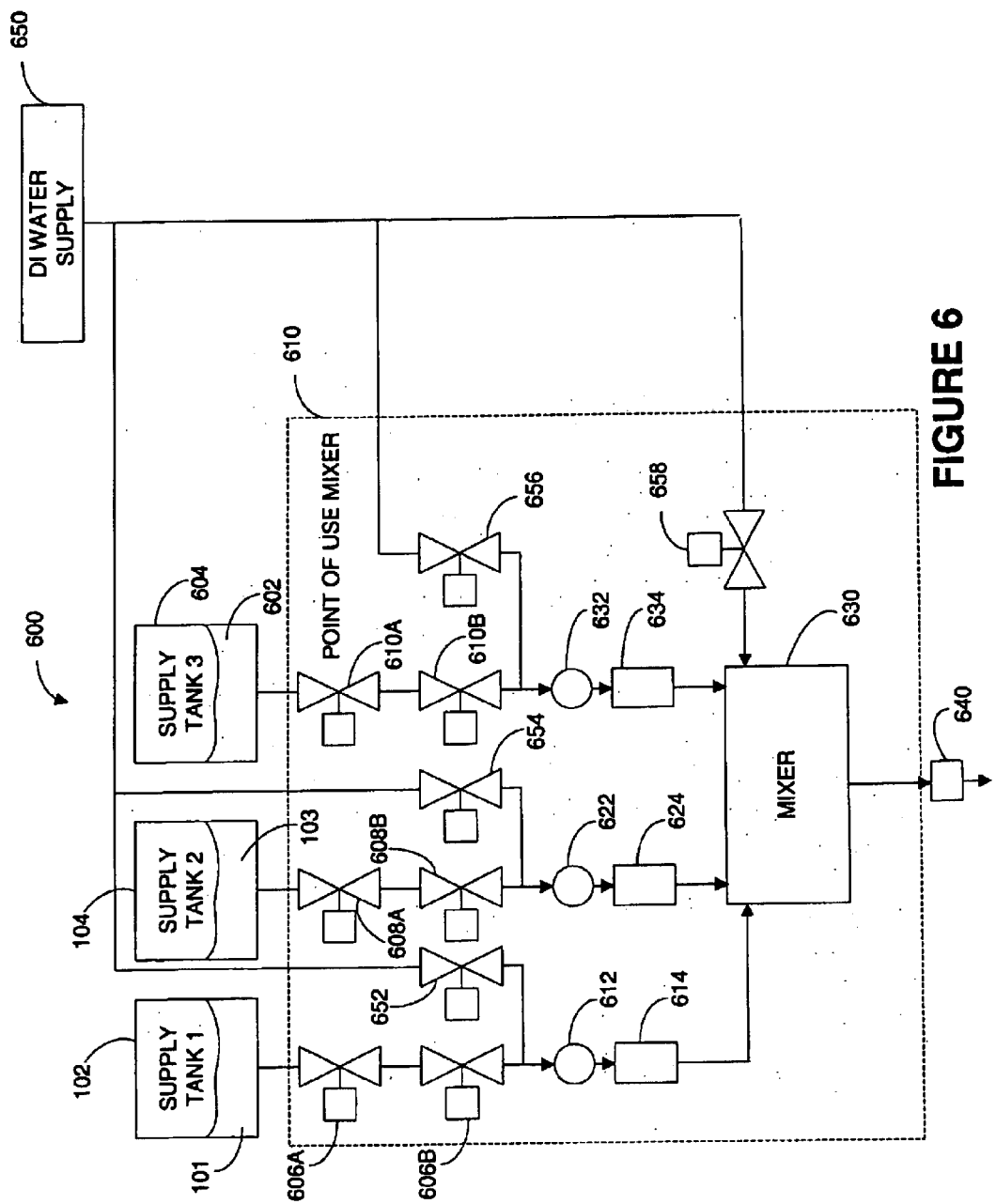
FIG. 6 is a piping and instrumentation diagram (P&ID) of a point of use mixing system using three chemicals and a flushing system in accordance with one embodiment of the present invention.

FIG. 6 is a piping and instrumentation diagram (P&ID) of a point of use mixing system 600 using three chemicals and a flushing system in accordance with one embodiment of the present invention. Although FIG. 6 illustrates a three chemical point of use system, the system and processes described below can also be extended to four or more chemicals. A first chemical 101 is stored in a first supply tank 102. A second chemical 103 is stored in a second supply tank 104. A third chemical 602 is stored in a third supply tank 604. A point mixer 610 includes a several components that mix the first, second and third chemicals 101, 103, 602. The point of use mixer 610 includes two supply valves for each of the three chemicals. Dual supply valves 606A, 606B for the first chemical 101. Dual supply valves 608A, 608B for the second chemical 103. Dual supply valves 610A, 610B for the third chemical 602. Dual supply valves increase the safety of the control of the first, second and third chemicals 101, 103, 602, respectively because a failure of any one valve of a dual supply valve pairs will not allow the respective chemical to flow.

First, second and third pumps 612, 622, 632 pump the respective first, second and third chemicals 101, 103, 602. First, second and third flow sensors 614, 624, 634 detect the flow of the first, second and third chemicals 101, 103, 602 output from the respective first, second and third pumps 612, 622, 632. The flow of the first, second and third chemicals 101, 103, 602 output from the first, second and third flow sensors 614, 624, 634 are input into three respective inputs in a four chemical mixer 630. The first, second and third chemicals 101, 103, 602 can be mixed in the four chemical mixer 630. The point of use mixing system 600 also includes a mixture sensor 640 to monitor the mixture output from the mixer 630.

The point of use mixing system 600 further includes a deionized (DI) water system. The DI water system includes a DI water supply 650 and four DI water supply valves 652, 654, 656, 658. DI water is used to flush out different portions of the point of use mixing system 600. For example, if the first chemical must be flushed out of the point of use mixing system 600, the dual supply valves 606A, 606B are closed. Next, the DI supply valve 652 is opened so that the DI water can flow through the first pump 612, the first flow sensor 614 and through the mixer 630 and out the outlet of the mixer 630.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

It will be further appreciated that the instructions represented by the operations in FIGS. 2B–2D are not required to be performed in the order illustrated, and that all the processing represented by the operations may not be necessary to practice the invention. Further, the processes described in FIGS. 2B–2E can also be implemented in software stored in the memory systems of the controller 240.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method of mixing two or more chemical solutions for a CMP system comprising:
   pumping a first chemical solution to a mixing point at a point of use;
   monitoring a flow rate of the first chemical solution from a first pump;
   pumping a second chemical solution to the mixing point the pumping of at least one of the first chemical solution and the second chemical solution includes minimizing particle generation within the respective first chemical solution and the second chemical solution;
   monitoring a flow rate of the second chemical solution from a second pump;
   controlling the flow of the first and second chemical solutions into the mixing point upon demand for a mixture of the first and second chemical solutions; and
   outputting the mixture to a CMP process at the point of use.

2. The method of claim 1, wherein controlling the flow of the first and the second chemical solutions into the mixing point includes:
   controlling the flow rate of the mixture according to an aspect of the mixture.

3. The method of claim 2, wherein the aspect of the mixture includes a pH level of the mixture.

4. The method of claim 1, wherein controlling the flow of the first and the second chemical solutions into the mixing point includes:
   controlling a flow rate of the mixture from the mixing point according to the flow rate of the first chemical solution.

5. The method of claim 1, wherein controlling the flow of the first and the second chemical solutions into the mixing point includes:
   controlling a flow rate of the mixture from the mixing point according to the flow rate of the second chemical solution.

6. The method of claim 1, wherein controlling the flow of the first and the second chemical solutions into the mixing point includes:

controlling a flow rate of the mixture from the mixing point according to a first quantity setpoint of the first chemical solution.

7. The method of claim 1, wherein controlling the flow of the first and the second chemical solutions into the mixing point includes:

controlling a flow rate of the mixture from the mixing point according to a second quantity setpoint of the second chemical solution.

8. The method of claim 1, wherein in pumping the first chemical solution includes:

regulating the pressure to substantially reduce any pressure fluctuations.

9. A CMP system comprising:

a first pump having an input coupled to a first chemical supply;

a first flow sensor coupled to an output of the first pump;

a second pump having an input coupled to a second chemical supply;

a second flow sensor coupled to an output of the second pump;

a mixing point having inputs coupled to the output of the first flow sensor and the output of the second flow sensor; and a controller configured to receive signals from the first and second flow sensors and to produce control signals for the first and second pumps and the mixing point and configured to cause a mixture of the first and second chemical solutions upon a demand from a CMP process the pumping of at least one of the first chemical solution and the second chemical solution includes minimizing particle generation within the respective first chemical solution and the second chemical solution.

10. The system of claim 9, further comprising:

a mixture sensor coupled to the output of the mixing point and a third input to the controller.

11. The system of claim 10, wherein the mixture sensor is a pH sensor.

12. The system of claim 9, wherein the controller includes:

a first output coupled to a control input of the first control valve;

a second output coupled to a control input of the second control valve;

a first input coupled to an output of the first flow sensor;

a second input to an output of the second flow sensor; and a control scheme.

13. The system of claim 9, wherein the control scheme includes a proportional, integral, derivative (PID) control.

14. The system of claim 9, wherein the mixer includes:

a first control valve coupled between an output of the first flow sensor and a mixture manifold;

a second control valve coupled between an output of the second flow sensor and the mixture manifold; and a mixing point output control valve coupled between the mixture manifold and a mixture distributor.

15. The system of claim 9, wherein the first pump includes a pressure regulator.

16. The system of claim 9, wherein the pump includes a tubephram-type pump.

17. The system of claim 9, wherein the pump includes a rotary-type pump.

18. The system of claim 9, wherein the pump has a discharge capacity of between 15 and 250 ml per minute.

19. The system of claim 9, wherein the pump produces fewer chained particles.

20. A mixing system comprising:

a first pump having an input coupled to a first chemical supply;

a first flow sensor coupled to an output of the first pump;

a second pump having an input coupled to a second chemical supply;

a second flow sensor coupled to an output of the second pump;

a mixing point having inputs coupled to the output of the first flow sensor and the output of the second flow sensor; and a controller configured to receive signals from the first and second flow sensors and to produce control signals for the first and second pumps and the mixing point and configured to cause a mixture of the first and second chemical solutions upon a demand from a CMP process, the pumping of at least one of the first chemical solution and the second chemical solution includes minimizing particle generation within the respective first chemical solution and the second chemical solution.

* * * * *